United States Patent
Nies et al.

(10) Patent No.: US 10,945,109 B2
(45) Date of Patent: Mar. 9, 2021

(54) WIRELESS APPARATUS, SYSTEM, AND METHOD FOR CONTROLLING A VALVE

(71) Applicant: MELNOR, INC., Winchester, VA (US)

(72) Inventors: Juergen Nies, Winchester, VA (US); Ha Duong, Winchester, VA (US); Vicky Michael, Winchester, VA (US); Stephen Campbell Brass, Washington, DC (US); Shishir Jha, Frederick, MD (US); Alexander Preston Athey, Frederick, MD (US)

(73) Assignee: Melnor, Inc., Winchester, VA (US)

( * ) Notice: Subject to any disclaimer, the term of this patent is extended or adjusted under 35 U.S.C. 154(b) by 0 days.

(21) Appl. No.: 14/664,242

(22) Filed: Mar. 20, 2015

(65) Prior Publication Data

US 2015/0268670 A1 Sep. 24, 2015

Related U.S. Application Data (60) Provisional application No. 61/968,157, filed on Mar. 20, 2014.

(51) Int. Cl.
*A01G 25/16* (2006.01)
*H04W 4/70* (2018.01)
(Continued)

(52) U.S. Cl.
CPC ............. *H04W 4/80* (2018.02); *A01G 25/16* (2013.01); *B05B 12/00* (2013.01); *H04L 12/2816* (2013.01); *H04L 67/125* (2013.01); *H04W 4/70* (2018.02); *B05B 12/12* (2013.01); *G05B 2219/2625* (2013.01)

(58) Field of Classification Search
CPC ...... A01G 25/167; A01G 26/16; A01G 25/16; G05B 2219/2626; G05B 2219/2625; H04W 4/70; H04W 4/80; H04L 12/2816; H04L 67/125; B05B 12/00; B05B 12/12
See application file for complete search history.

(56) References Cited

U.S. PATENT DOCUMENTS 6,782,310 B2   8/2004   Bailey et al.
6,823,239 B2   11/2004   Sieminski
(Continued)

FOREIGN PATENT DOCUMENTS

CN   202588048 U   12/2012
CN   102845284 A   1/2013
(Continued)

OTHER PUBLICATIONS

International Search Report dated Jun. 19, 2015 issued in application No. PCT/US2015/021534, with form PCT/ISA/220 and PCT/ISA/237 (9 pages).
(Continued)

*Primary Examiner* — M. N. Von Buhr
(74) *Attorney, Agent, or Firm* — HEA Law PLLC; Darrin A. Auito (57) ABSTRACT

A wireless water timer and valve control system includes a control unit in wireless WiFi communication with a router and a valve unit in wireless communication with the control unit and designed to connect to a faucet. The valve unit includes a valve that is operated wirelessly via a signal received by the control unit.

26 Claims, 9 Drawing Sheets

(51) Int. Cl.
*H04W 4/80* (2018.01)
*H04L 12/28* (2006.01)
*H04L 29/08* (2006.01)
*B05B 12/00* (2018.01)
*B05B 12/12* (2006.01)

(56) References Cited

U.S. PATENT DOCUMENTS

| | | | |
|---|---|---|---|
| 7,810,515 B2 | 10/2010 | Nies et al. | |
| 8,478,450 B2* | 7/2013 | Lu | H04L 12/2836 700/289 |
| 9,049,821 B1 | 6/2015 | Hanna | |
| 2002/0002627 A1* | 1/2002 | Stead | H04L 29/06 709/250 |
| 2005/0107924 A1* | 5/2005 | Bailey | A01G 25/167 700/284 |
| 2005/0125083 A1* | 6/2005 | Kiko | G05B 15/02 700/19 |
| 2008/0077425 A1* | 3/2008 | Johnson | G06Q 10/103 705/301 |
| 2008/0255708 A1* | 10/2008 | Nies | A01G 25/167 700/284 |
| 2009/0145974 A1 | 6/2009 | Fekete | |
| 2009/0150002 A1* | 6/2009 | Fekete | G05B 15/02 700/284 |
| 2009/0281672 A1* | 11/2009 | Pourzia | A01G 25/167 700/284 |
| 2010/0044604 A1* | 2/2010 | Burke | E03C 1/057 251/129.04 |
| 2010/0121968 A1* | 5/2010 | Clark | H04L 12/2818 709/230 |
| 2010/0161144 A1* | 6/2010 | Crist | A01G 25/16 700/284 |
| 2010/0179701 A1* | 7/2010 | Gilbert | A01G 25/16 700/284 |
| 2011/0035063 A1 | 2/2011 | Palayur | |
| 2011/0211584 A1* | 9/2011 | Mahmoud | H04L 12/2834 370/401 |
| 2012/0041606 A1 | 2/2012 | Standerfer et al. | |
| 2012/0166010 A1* | 6/2012 | Chou | H04L 12/2818 700/296 |
| 2012/0182939 A1* | 7/2012 | Rajan | A61B 5/0022 370/328 |
| 2012/0233478 A1* | 9/2012 | Mucignat | H04L 61/2514 713/320 |
| 2012/0239221 A1* | 9/2012 | Mighdoll | G05B 15/02 700/300 |
| 2012/0256009 A1* | 10/2012 | Mucignat | G05D 23/1905 236/1 C |
| 2012/0273587 A1 | 11/2012 | Hitt | |
| 2013/0173070 A1 | 7/2013 | Tennyson | |
| 2013/0207771 A1* | 8/2013 | Ersavas | G05B 15/02 340/3.1 |
| 2013/0226357 A1* | 8/2013 | Ersavas | A01G 25/167 700/284 |
| 2013/0232243 A1* | 9/2013 | Johnson | G06Q 10/103 709/220 |
| 2014/0031992 A1* | 1/2014 | Bergman | F24F 11/00 700/276 |
| 2014/0039697 A1* | 2/2014 | Weiler | H04L 63/102 700/284 |
| 2014/0172176 A1* | 6/2014 | Deilmann | H04L 12/2827 700/275 |
| 2014/0207282 A1* | 7/2014 | Angle | G05B 15/02 700/257 |

FOREIGN PATENT DOCUMENTS

| | | |
|---|---|---|
| CN | 103609393 A | 3/2014 |
| CN | 103621383 A | 3/2014 |
| WO | 2014/024428 A1 | 2/2014 |

OTHER PUBLICATIONS

Notification of Transmittal of International Preliminary Report on Patentability (Forms PCT/IPEA/416) issued in counterpart International Application No. PCT/US2015/21534 dated Mar. 30, 2016. (7 pages).
Extended Search Report dated Aug. 30, 2017, issued in counterpart European Application No. 15765833.7 (14 pages).
Office Action dated Jun. 7, 2018, issued in counterpart European Application 15 765 833.7 (8 pages).
Examination Report dated Jun. 4, 2018, issued in Australian Application No. 2015231169. (3 pages).
Office Action dated Dec. 4, 2018, issued in counterpart Chinese application No. 201580015000.1, with English translation. (13 pages).
Search Report dated Nov. 24, 2018, issued in counterpart Chinese application No. 2015800150001. with English translation. (4 pages).
Office Action dated Dec. 6, 2019, issued in CN Application No. 201580015000.1, with English translation. (7 pages).
Office Action dated Jan. 7, 2020, issued in JP Application No. 2017-501118, with English translation. (13 pages).
Office Action dated May 20, 2019, issued in counterpart CN Application No. 201580015000.1, with English translation. (19 pages).
Office Action dated Jun. 7, 2019, issued in counterpart EP Application No. 15765833.7. (10 pages).
Office Action dated Feb. 12, 2019, issued in JP Application No. 2017-501118, with English translation. (6 pages).
Office Action dated Mar. 26, 2020, issued in counterpart EP Application No. 15765833.7. (8 pages).

* cited by examiner

WIRELESS APPARATUS, SYSTEM, AND METHOD FOR CONTROLLING A VALVE

FIELD OF THE INVENTION

The present invention relates to a Wi-Fi watering system which includes a valve unit designed to wirelessly communicate with a control unit that is connected to a Wi-Fi network and configured to be programmed by a user via the Internet.

SUMMARY OF THE INVENTION

A wireless water timer and valve control system includes a control unit in wireless WiFi communication with a router and a valve unit in wireless communication with the control unit and designed to connect to a faucet. The valve unit includes a valve that is operated wirelessly via a signal received by the control unit. The valve unit may also be configured to wirelessly communicate with a moisture sensor and relay a moisture sensor status received from the moisture sensor to the control unit in order to operate the valve unit based on the moisture sensor status. The control unit may also be configured to operate the valve unit based at least on a schedule sent to the control unit over the Internet.

BRIEF DESCRIPTION OF THE DRAWINGS

The present invention will be described with reference to the accompanying drawings, wherein.

DETAILED DESCRIPTION OF THE INVENTION

An embodiment of the present invention will hereinafter be described with reference to the aforementioned drawings. The sprinkler system illustrated and described in this application is configured to utilize a home owner's private Wi-Fi network.

Figure 1:
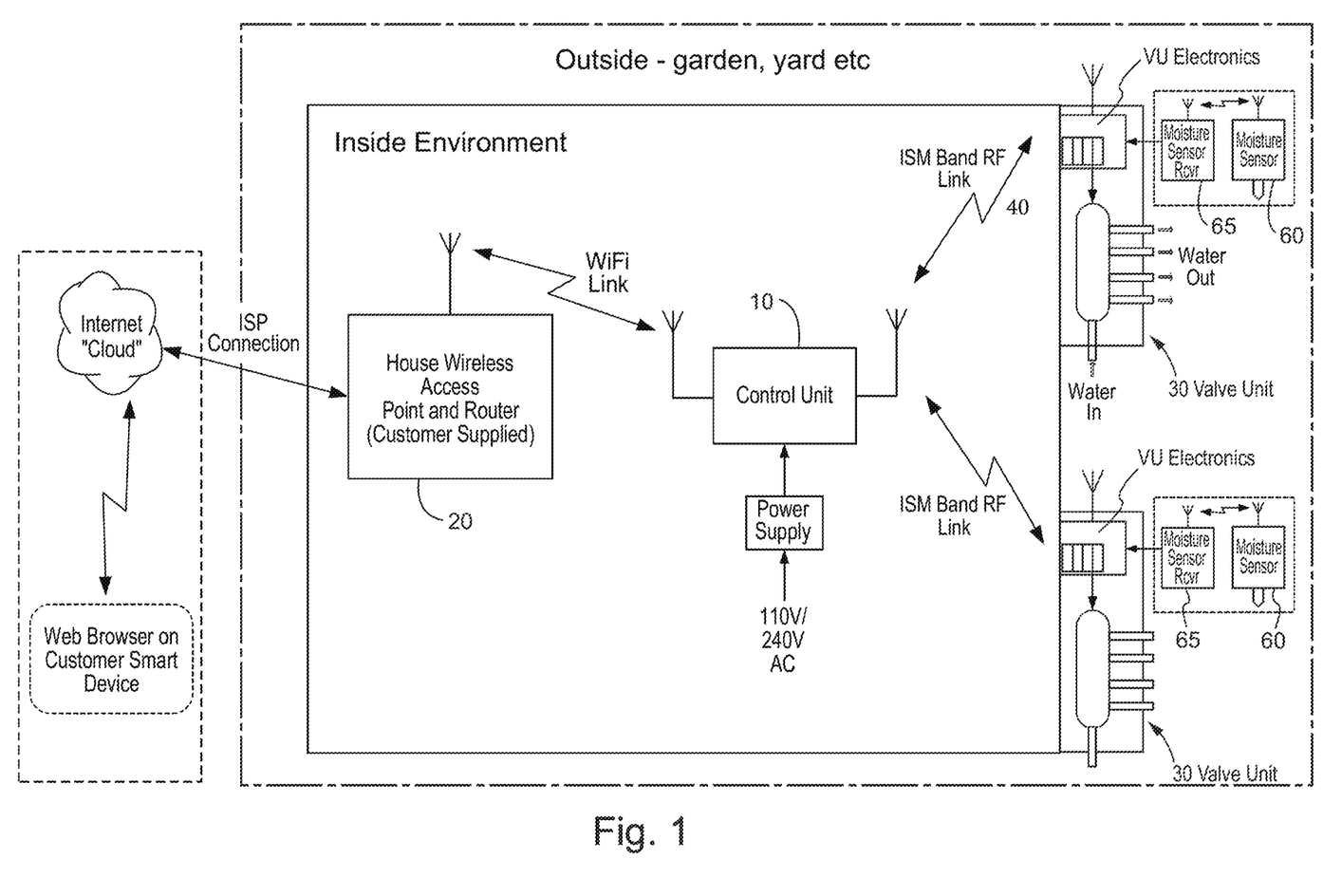
FIG. 1 is a block diagram of an Internet controlled sprinkler system according to one embodiment.

In one embodiment, shown in FIG. 1, the system consists of two units, Control Unit 10 (herein after, "CU") (e.g., located inside the house or in a location where it is within Wi-Fi range of home router 20 and is within range of the outside-located VUs) that incorporates the Wi-Fi interface, and Valve Unit 30 (hereinafter, "VU") (e.g., located outside the house near faucets and within RF link rage of the CU) that incorporates and controls one or more valves. The CU 10 is connected to the router 20 (e.g., local Internet access point) through a Wi-Fi connection, not an Ethernet cable. Disadvantages of an Ethernet setup include connection limitations (e.g., limited number of ports at local access point or hub), location limitations (e.g., location possibilities of CU determined by length of Ethernet cable), and general consumer dislike of unnecessary cables. Wi-Fi connection improves communication between the CU 10 and the VU 30, because the CU 10 can be positioned in a desirable location to enable communication with the VU 30 via ISM Band RF Link 40, as discussed below. Most preferably, the CU 10 is positioned in an area that has a strong Wi-Fi signal (e.g. walls, electrical equipment and other material may affect the signal) as well as within 200 feet of the VU 30.

In this embodiment, for example, communication between the CU 10 and the VU 30 is made by the ISM Band (e.g., 910 MHz for US and 833 MHz for Europe) RF link 40, however other known communication mediums may be used. The CU 10 is configured to control multiple VU's 30. In this embodiment, the CU 10 controls two VUs 30, each of which has four valves 50 incorporated in it. However, it is known that the VU 30 can incorporate more or less than four valves 50. Each VU 30 is configured to wirelessly communicate with a moisture sensor 60 possibly via a moisture sensor receiver 65 (e.g., one of Melnor's existing moisture sensors and/or the "Smart Water Timer" described in U.S. Pat. No. 7,810,515), and relay the moisture sensor's status to the CU 10, which will control the VU 30 based on the status (e.g., make the water/not water decision based on user settings). The CU 10 may be powered from a readily available "wall wart" type power supply and the VUs may be powered by standard AA batteries.

In operation of the water system described above, a user will program via mobile device, tablet, or personal computer, a watering schedule using a web-based GUI interface. The CU 10 will contact the web server 20 via Wi-Fi to update its schedule (e.g., continuously, time intervals, on command, etc.). The server 20 extracts the essential information from the GUI settings for the CU 10 to run the programmed watering schedule and sends it to the CU 10. The CU 10 then performs the programmed watering cycle(s) by commanding valve operations to each VU 40. The CU 10 may be configured to maintain, for example, a seven day program and run it continuously until it is modified by the user. Thus if the Internet connection is lost for any reason, the CU 10 will continue watering according to the last schedule downloaded to it.

Figure 4:
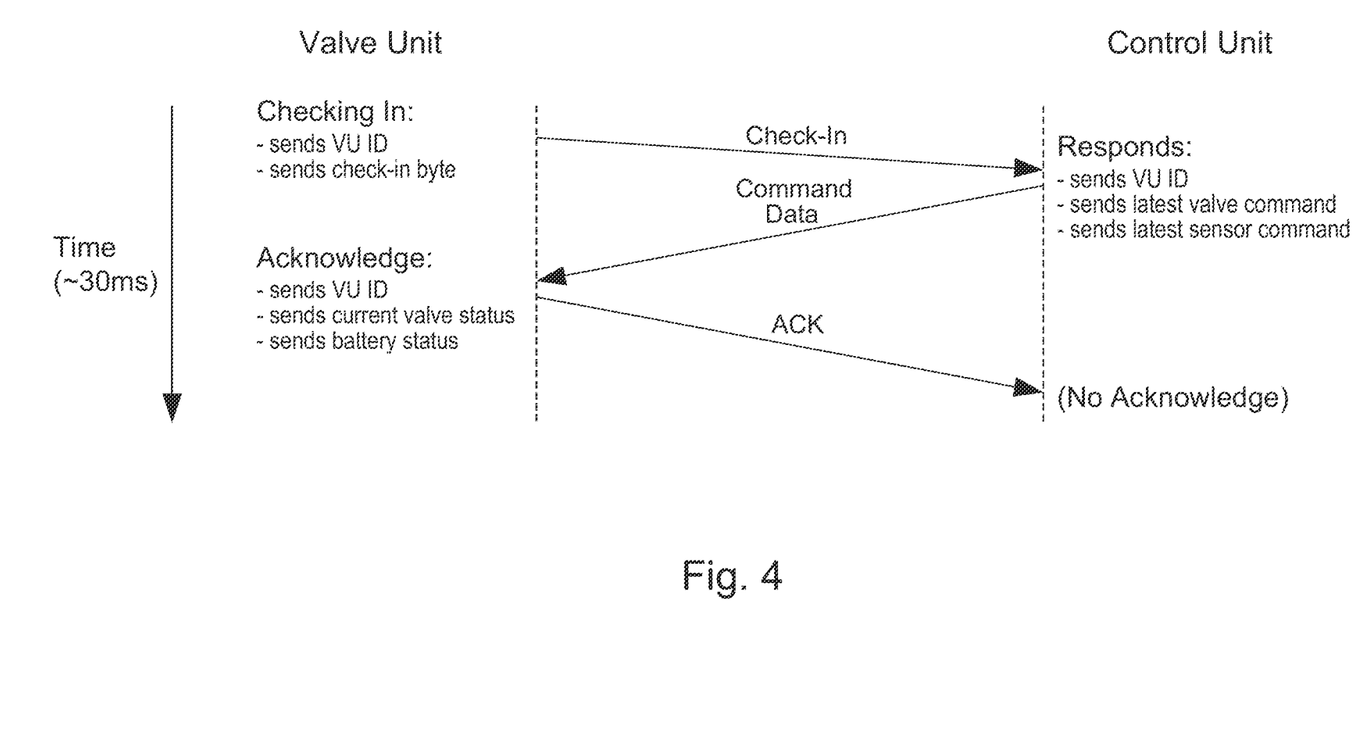
FIG. 4 is a diagram of a routine check-in data exchange that occurs periodically between the valve unit and the control unit of the system illustrated in FIG. 1.

The CU 10 may be configured to upload a current valve status 410 and if available, moisture sensor status 420 so that the user can see what is happening via simple status indicators. The CU 10 may be configured to upload this information every time the CU 10 contacts the server 20, or at other desired intervals.

During operation the VU 30 is configured to contact the CU 10 (e.g., using the ISM radio) to receive the latest settings for each of the valves 50 of the VU 30. The VU 30 does not maintain any of schedule settings and is essentially "dumb" (e.g., switching valves on or off as commanded for that minute). If the VU 30 loses contact with the CU 10, then after a certain number of attempts (e.g., after 5 attempts) or certain amount of time (e.g., 5 minutes), the VU 30 will shut off all valves 50 as a safety measure.

On command from the CU 10, the VU 30 will determine whether the moisture sensor 60 is connected to the system, and if so, the VU 30 will relay received sensor information to the CU 10. Controlling the moisture sensor 60 (e.g., switching it on and off, and waiting for the signal) is under control of the CU 10, which will use it before and during a watering cycle if the user has programmed it to do so.

In one embodiment, in order to secure the CU 10 and its associated VUs 30 so that, for example, a neighbor with a similar system cannot access components that are not part of the neighbor's system, each of the CUs 10 and VUs 30 will have an identifier, such as a serial number. For example, the identifier of the CU 10 may be based on a unique MAC address (e.g., required by all devices that can connect to the internet), and the VUs 30 may be identified with a 16 bit number. This will allow 64 k valve units be manufactured with unique serial numbers. Other known identifiers may be used to uniquely identify each of these devices.

Figure 2:
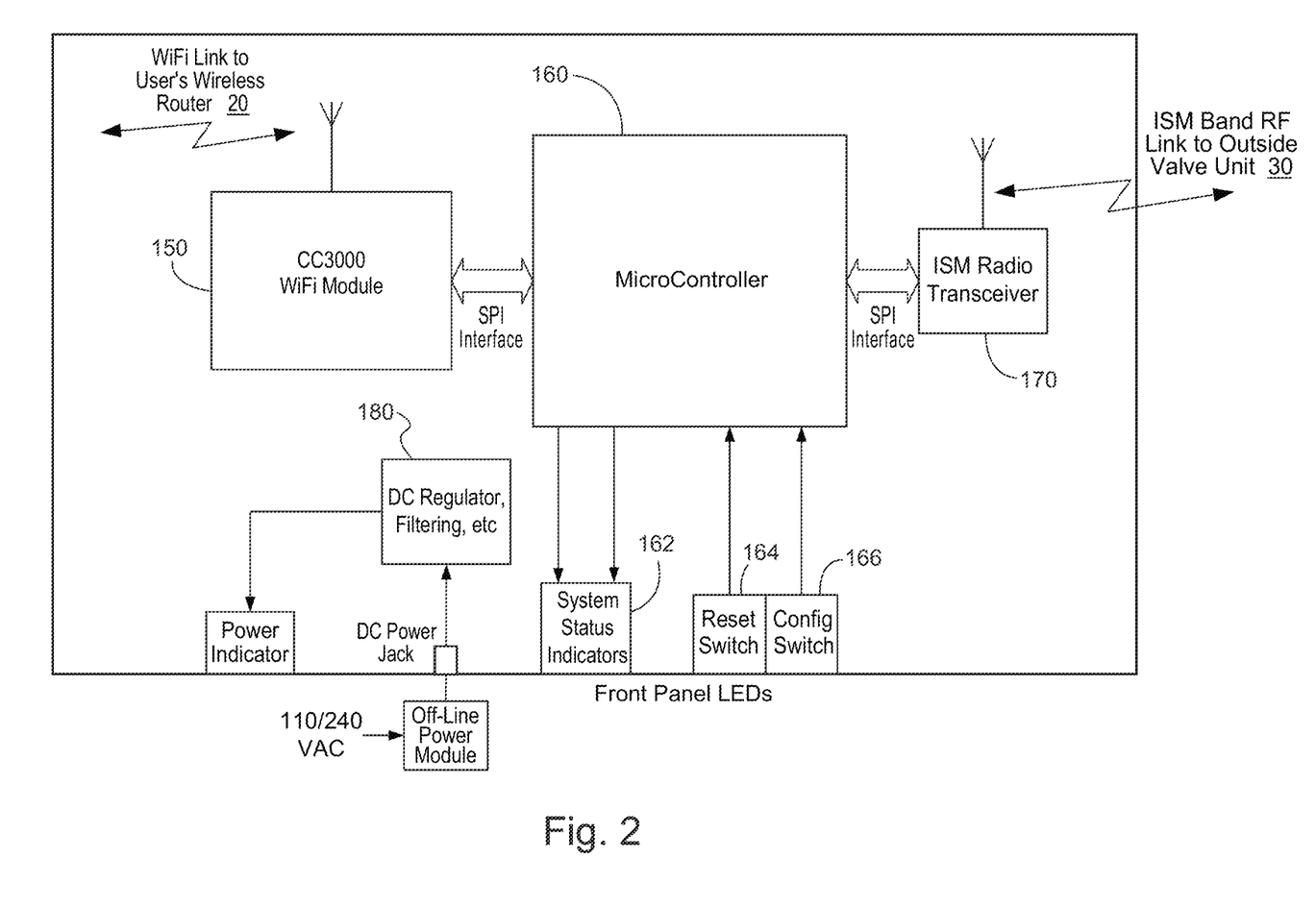
FIG. 2 is a block diagram of the control unit illustrated in FIG. 1.
Figure 6:
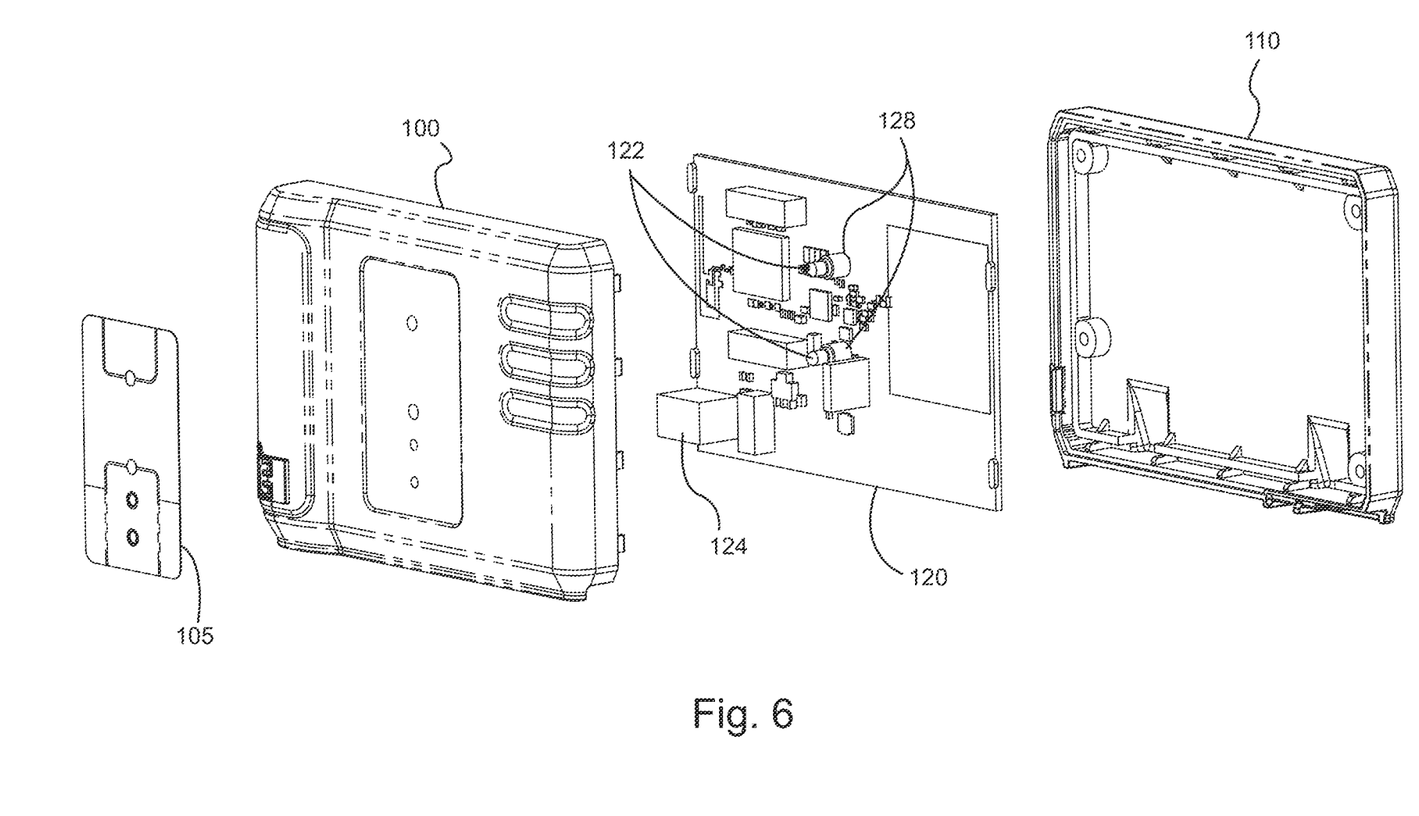
FIG. 6 is an exploded view of one example of a control unit illustrated in FIG. 1.

One embodiment of the CU 10 is shown in FIGS. 2 and 6 and described below.

As shown in the embodiment illustrated in FIG. 6, the CU 10 assembly comprises a front housing 100, a back housing 110, a PCB assembly 120 arranged in a space provided between the front and back housing. The front housing includes a front label portion 105 and one or more openings configured to emit light produced, for example, by an LED. The PCB assembly 120 includes LED(s) 122 (e.g., indicator/status lights), power connector 124 configured to accommodate a power adaptor 126, and LED spacer(s) 128. The front housing is attached to the back housing and is designed to secure the PCB assembly therebetween.

As shown in the embodiment illustrated in FIG. 2, the CU 10 includes a wireless module 150 for communicating with the home router or server 20, microcontroller 160, and communication means 170 (e.g., ISM band radio) for communication with the VU 30.

In this embodiment, the microcontroller 160 to wireless SPI-based interface includes information to let the microcontroller 10 know what kind of interface it has—this can be as simple as hard-wired I/O bits, when a different wireless module is detected, the microcontroller will run the appropriate software to support that wireless format.

A Real Time Clock (RTC) keeps track of the time and schedules watering operations according to predetermined user interface settings. The RTC is updated/synchronized every time the CU 10 checks in to the server 20.

In this embodiment, the CU 10 functions include at least the following: support all Wi-Fi communications; run timing functions based on external user/webpage input; relay manual valve control commands to external VU(s) 30 when the latter requests; send valve status to the web GUI when requested; update local status indicators as/when appropriate. In another embodiment, the CU 10 functions to support all required Z-Wave or Zigbee device and command classes when required and to support all Z-Wave, Zigbee functions required for inclusion in a home automation network.

In this embodiment, the hardware for the CU 10 may include: input power filtering/conditioning—regulation from wall-wart type DC supply 180; microcontroller 160, such as Texas Instruments PN MSP430G2955; Wi-Fi module 150, such as Texas Instruments PN CC3000; an ISM radio chip 170, such as SiLabs Si4455; known local status indicator(s); and a PCB, such as a 4-layer PCB incorporating 2.5 GHz and 910 MHz antenna in PCB traces.

The selected microcontroller may include flash memory, RAM, and all the necessary support functions such a CPU clock, Power On Reset circuit etc, to be self-contained, needing no addition support devices. The selected microcontroller may also include a wide range of peripherals, including several serial interfaces, of which two are SPI (e.g., one of these is required to interface to the CC3000 WiFi module, another to interface to the ISM band radio).

The status indicators 162 are designed to show the status of the various communication functions in the CU 10, such as power indicator (e.g., red light), web interface status (e.g., blinking red light when attempting to establish a connection to the user's home router 20), and web service status (e.g., blinking green light when not registered, solid otherwise).

The momentary contact switches include, for example, a reset switch 164 and a configuration switch 166. The reset switch 164 is configured to cause a hard reset of the microcontroller 160 to restore the CU 10 to its initial condition. In this state, for example, all router configuration information will be lost and the user may be required to re-register the CU 10 with the server per the first time use. The reset switch 164 may be arranged so that it is difficult to access, e.g., accessible via a small hole in the front panel and can only be actuated by a paper clip or similar. The configuration switch 166 is configured to initiate a "Smart Configuration" process which the user may be required to perform so that the CU 10 gains access to the home router 20 and internet (e.g., configuration process for connecting CC3000 module using the Texas Instruments Smart Config app on a smartphone or PC). In one embodiment, the configuration switch 166 consists of PCB contacts shorted by a conductive elastomeric pad when pushed (e.g., similar to that used on Melnor's Model 3012 timer.)

Different embodiments of the VU 30 are described below and illustrated in the exploded views of FIGS. 7 and 8.

Figure 7:
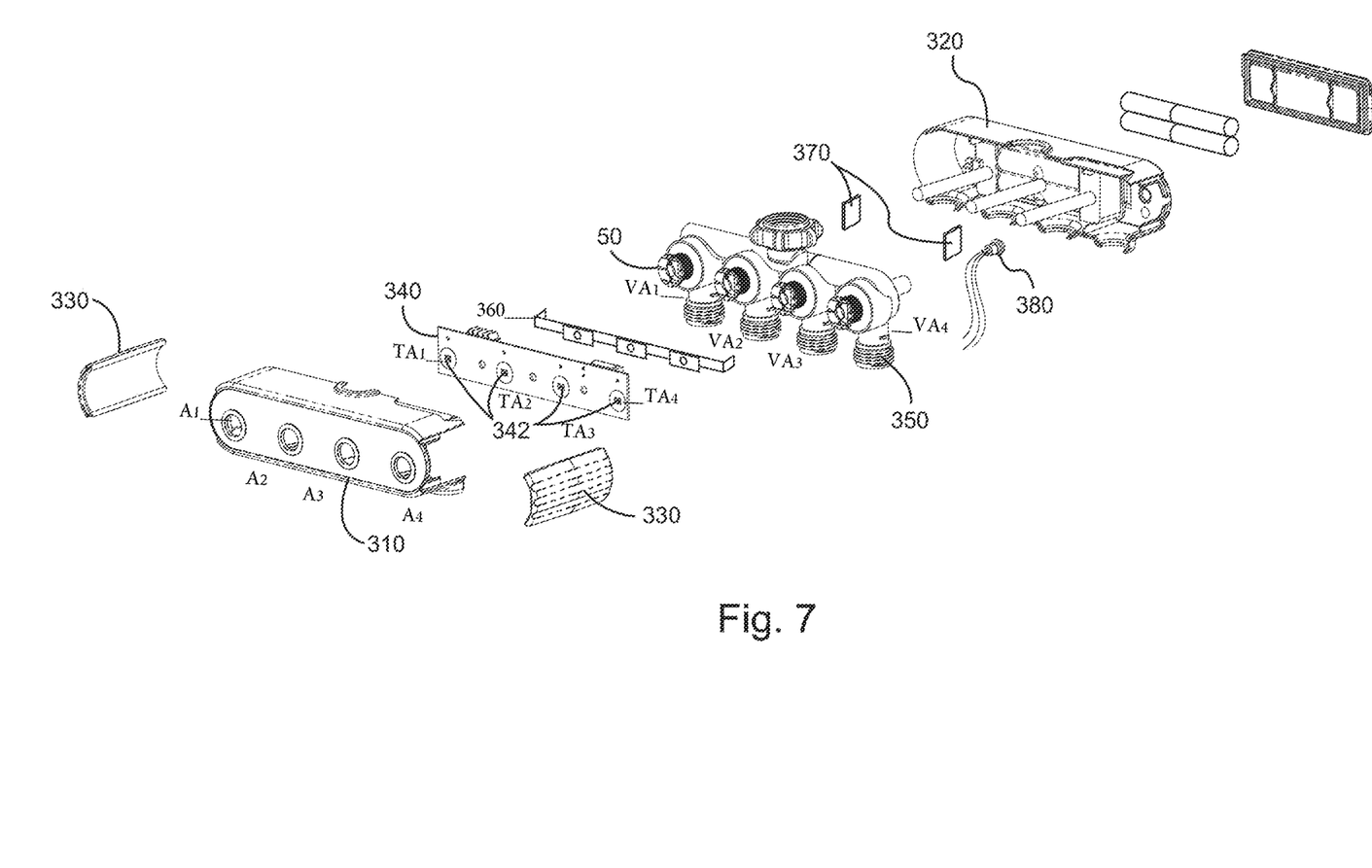
FIG. 7 is an exploded view of one example of a valve unit illustrated in FIG. 1.

FIG. 7 illustrates one embodiment of the VU 30 assembly, which comprises front housing 310, back housing 320, and PCB assembly 340 and valve assembly 350 arranged in a space defined by the front and back housing. Side covers 330 may also be included to define the space. In this embodiment, the valve assembly 350 includes four solenoid valves arranged in parallel and extending lengthwise within the VU. The valve assembly 350 connects to a faucet (either directly or via a quick connect) to communicate water from the faucet to each of the valves 50. In this embodiment, the PCB assembly 340 includes four PCB touch pads 342 arranged in parallel and extending lengthwise within the VU 30, e.g., one touch pad 342 corresponding to each valve 50 of the valve assembly 350. A PCB locator bracket 360 is sandwiched between the PCB assembly 340 and the valve assembly 350 and extends lengthwise within the VU 30. The front housing 310 includes a front surface extending lengthwise. In this embodiment, the front surface includes four on/off touch pads 342, corresponding to the number of valves 50 in the valve unit 30. Each of the touch pads 342 is arranged such that if a user touches area $A_1$-$A_4$, contact is made with corresponding touch pad $TA_1$-$TA_4$, which turns on/off valve unit $VA_1$-$VA_4$. The back housing 320 is configured to secure battery terminals 370 and a battery (e.g., four AA batteries in this embodiment). The back housing is also configured to accommodate a moisture sensor socket 380 (e.g., the socket could also be configured on another portion of the VU.)

In this embodiment, the VU 30 is battery operated and includes at least one capacitive switch 402 associated with each valve 50 inside the VU 30 (e.g., to activate the valves manually). Two (or more) capacitive switches 402 may be used for each valve 50 in order to provide additional sensing that can be used to prevent false activation (e.g., 4 valves and 8 capacitive switches). The VU 30 "wakes up" periodically, such as every 100 ms to scan the switches, and every minute it will enable communication means 410 (e.g., ISM band radio) to get valve status from the CU 10 to maintain one minute timing resolution. The "wake up" period can be set for different periods. During operation, if a valve 50 illustrated in the embodiment shown in FIG. 3 needs to be switched on or off it will activate a voltage booster 404, and enable a valve driver 406 when the voltage is high enough or reaches a predetermined threshold. In this embodiment, when a valve has been switched ON—either under program (described above) or manual control (e.g., capacitive switch)—an appropriate LED status indicator light 408 will flash.

Figure 3:
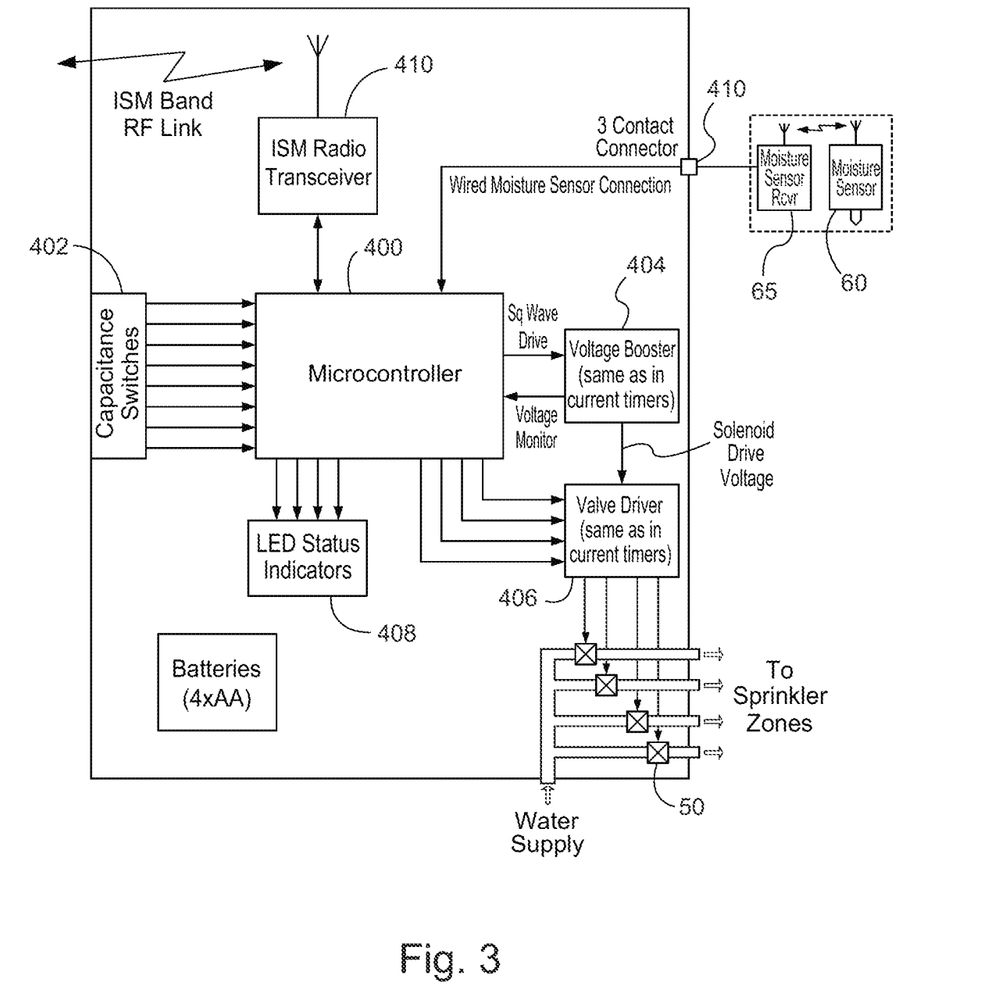
FIG. 3 is a block diagram of the valve unit illustrated in FIG. 1.

According to this embodiment, the VU 30 is configured to only open and close valves when the CU 10 commands it or the user "pushes" or "touches" one of the manual capacitive switches 402. This configuration (e.g., "dumb") requires a smaller and less expensive microcontroller than a more intelligent configuration.

One advantage of this PCB-based capacitive touch switch design is that it reduces the number of external components normally found on a VU 30, which can break off or become damaged because of use and other elements. Another advantage is ease of control. The user simply touches the switch to open the valve and then touches it again to close the valve. Another advantage relates to the aesthetics, namely the relative simplicity of the exterior design.

Figure 8:
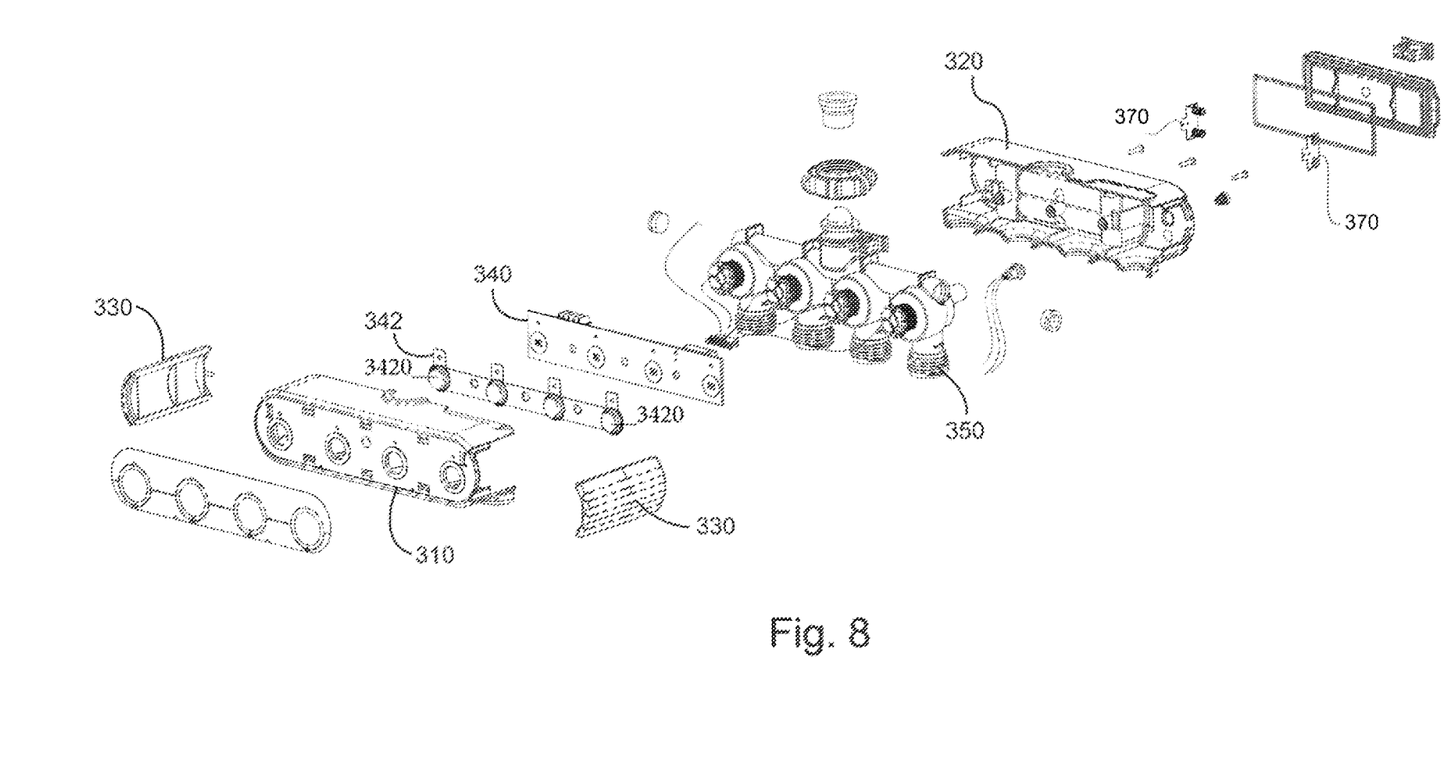
FIG. 8 is an exploded view of another example of a valve unit illustrated in FIG. 1.

FIG. 8 illustrates another embodiment of the VU 30 assembly, which comprises a plurality of contact push buttons 3420 instead of the capacitive touch switches 402 or touchpads 342 described above and illustrated in FIGS. 3 and 7. According to this embodiment, the VU 30 is configured to open and close valves when the CU 10 commands it or the user "pushes" one of the plurality of push buttons.

The VU 30 is configured to detect RF Link failure and shut off all programmed ON valves in the event of such failure. In this condition, for example, only the user can set a valve ON using local control via the capacitive switches 342 or push buttons 3420. RF link failure and valve shutoff occurs when the VU 30 cannot talk to the CU 10 for a predetermined period (e.g., duration of several one-minute check-in communication attempts).

In this embodiment, the VU 30 functions include at least the following: support all system setup and initialization requirements; receive current moisture sensor data from the optional moisture sensor receiver 65; receive valve control data from the CU 10; scan the capacitive switches 342 or push buttons 3420 for local manual operation; actuate valves 5 as required by the CU 10 or locally by the user; transmit moisture condition, battery and valve status 410 to the CU 10; control the voltage booster circuit 404 for actuating the valve solenoids; control the valve driver 406 to open and close the valves 50; update local valve status indicators; and detect a CU 10 communication failure (e.g., due to power outage, intermittent RF link, or hardware fault).

In this embodiment, the hardware for the VU includes: microcontroller 400, such as Texas Instruments PN MSP430G2755; battery or battery pack; ISM band RF transceiver chip 410, such as SiLabs PN Si4455; antenna, such as a helical coil antenna, possibly implemented in PCB etch; voltage booster circuit components 404; valve driver components 406; capacitive switches 402 for manual valve control; valve status indicators 408; a moisture sensor receiver connector 411, such as a 3-pin connector; a PCB, such as a 2 or 4-layer PCB.

During system setup and operation of the sprinkler system described herein, data is exchanged between the server 20, the CU 10, and the VUs 30. The following is a brief description of the data transferred between the parts of the system.

First, is a description of data transferred between the server 20 and the CU 30. This data includes setup data and schedule data.

In one example, during the beginning of the setup process, the user registers CU serial number or ID code before being able to access the web-based GUI interface. Registration may require logging onto a website that supports the GUI interface using the CU serial number associated with the user's CU 10 (e.g., may be marked on its housing). If the serial number is valid, the user will have access to a GUI interface where the user will enter, or register, the VU(s) 30 serial numbers or ID codes (e.g., similarly marked on the VU housing) to be used with the CU 10. Next, on the GUI interface, the user will be able to enter desired watering schedule details (e.g., schedule data) for the valve(s) 50 of each of the VU(s) 30. An additional VU 30 can be registered at the same time, or later if not purchased at the same time as the CU 10. The GUI interface itself is described below. The CU 10 may not store the VU ID code(s). Instead, each time the server 20 downloads schedule data, at the beginning of the schedule data is the VU ID code the user entered for the target VU 30. The CU 10 checks this against a request from a VU 30 to confirm that they are the same code, if not (e.g., for example if it has received a request from a neighbor's VU), the CU 10 will ignore the request. When the CU 10 receives a request from a VU 30 with a matching ID code, the CU 10 will send the valve or zone commands to the VU 20. According to another embodiment, the GUI interface will maintain a database of permissible ID codes assigned by the manufacturer of the CU and VU.

When the CU 10 is powered, the user may perform a "Smart Configuration" operation using a smartphone, PC or tablet, after which the CU 10 will be connected, for example, to the user's home Wi-Fi router 20. The CU 10 will then connect to the GUI server automatically, and obtain the schedule data, using the CU ID code for identification. If the CU 10 has been registered as described above, the GUI interface will download the schedule data for the VU(s) 30 associated with the CU 10. The schedule data is described next.

During operation the CU 10 is configured to periodically contact the GUI server, for example, to ask if there has been any changes made to the schedule. The GUI server will download a new schedule if necessary. In addition, the CU 10 will upload the current valve and moisture sensor 60 (if present) status. The data downloaded to the CU 10 may include the following: CU ID code; VU ID code(s); Sunday (Day 0) schedule and settings for 6 cycles for VU1, Zone (or valve #) 1, Zone 2 etc; Monday (Day 1) schedule and settings for 6 cycles for VU1, Zone (or valve #) 1, Zone 2 etc; Etc for the remaining days of the week for VU1; Sunday (Day 0) schedule and settings for 6 cycles for VU2, Zone (or valve #) 1, Zone 2 etc; Etc.

Thus there is a block of data associated with each zone for each cycle for each day of the week. Here is one example:

| Field Description | Range | # of bytes |
| --- | --- | --- |
| Cycle Start Time | 0-1439 mins | 2 |
| Cycle Stop Time | 0-1439 mins | 2 |
| Continuous/Misting | 1-15 mins On, 1-30 mins Off (0 in both fields = continuous) | 2 |

If the Cycle Start and Stop times are the same, then that cycle is inactive. This example includes 6 bytes/cycle/zone, or 6×6×4=144 bytes/day per zone. In addition there may be rain delay or sensor usage data associated with each day for each zone (but not cycle-related):

| Field Description | Range | # of bytes |
|---|---|---|
| Rain Delay | 0 or 1 | 1 |
| Sensor Usage | 0 or 1 | 1 |

This is an example in which a Rain Delay starts at the following midnight after the user "called" it, and extends in 24 hour increments. So for each day there will be a rain delay flag indicating to the CU 10 that regardless of the schedule for that day, no watering will occur. There is also an additional byte to indicate if a sensor attached is to be used for that zone.

This is an additional 2 bytes per zone per day, or 8 bytes/day total. In this example, the total schedule requirement for 4 valves (1 VU) for one day is 152 (=144+8), and for one week is 1064 bytes (=7×152). So the total week's schedule data for 2 valve units will be 2128 bytes.

Next, is a description of data transferred from the CU 10 to the GUI server. This data includes setup data and schedule data.

In one example, after the user has initiated a download with the CU and/or VU ID codes, the CU 10 responds with an "acknowledge." In this example, after successfully receiving the schedule data, the CU responds by sending the current status directly to the web service hosting the GUI. Whenever it performs it routine "heartbeat" contact with the pusher service, the latter will respond with the schedule. According to one embodiment, the CU will upload the current system status to the GUI web server as follows:

| Field Description | Range | # of bytes |
|---|---|---|
| CU ID # | MAC address | 6 |
| VU ID # | 0x0001 to 0xFFFF | 2 |
| Valve Status | On/Off bits for each valve | 1 |
| VU RF Link Status | Good/Lost Contact | 1 |
| VU Battery Level | 0-3.0 V (0-255 steps) | 1 |
| Sensor Water and Battery Flags | 0/1 for each flag | 1 |

Next, is a description of data transferred from the CU to the VU. This data includes command data.

The VU is configured to respond to commands from the CU and send back data regarding its battery status and relay sensor status. As soon as the VU receives a command packet containing its own ID, the VU will respond. According to one embodiment, the commands available are:

| Field Description | Range | # of bytes |
|---|---|---|
| VU ID # | 0x0001 to 0xFFFF | 2 |
| Valve and Sensor Commands | On/Off for each valve and 1 sensor | 1 |

Next, is a description of data transferred from the VU to the CU. This data includes VU status data.

According to one embodiment, the VU periodically wakes up and checks in to the CU (e.g., every minute). The CU responds by sending the valve and moisture sensor commands to the VU. The VU acknowledges receipt of the commands by repeating back the commands, and adding its battery and moisture sensor status. This data includes:

| Field Description | Range | # of bytes |
|---|---|---|
| VU ID | 0x0001 to 0xFFFF | 2 |
| Valve Status | On/Off for each valve | 1 |
| VU Battery Level | 0-3.0 V (0-255 steps) | 1 |
| Sensor Status | — | 1 |

The Sensor Flag status may also include bits to indicate if a sensor receiver is connected, and its functional status along with the sensor water and battery flags.

Next is described a GUI to CU packet description.

As described above, schedule data one VU for a week requires 1064 bytes, or 152 bytes for each day. The data may be downloaded in packets of one day, e.g., requiring 14 packets for one week with a two valve unit system. There is more than one type of packet sent from the GUI to the CU, but most of the time they will be schedule updates. Other possible packet types may include instructions to update the CU software code, and new code to be flashed, etc. The schedule update packet types will contain the valve unit ID number and day number. An example of a protocol and data flow between the GUI and Pusher is described in a later section.

Next is described CU to VU and VU to CU packet descriptions. One embodiment is shown in FIG. 4.

Packet types CU to VU include routine valve operation in response to "check in" packet from VU. Packet types VU to CU include routine check-in and "acknowledgment" receipt of check-in packet.

According to one embodiment, the VU 30 lets the CU 10 know if it has a moisture sensor 60 connected so that it can modify its watering schedule as necessary. The additional data that need to be conveyed includes, for example: (1) the VU 30 has a moisture sensor receiver 65 attached; (2) the CU 10 needs to tell the VU 30 to switch it on and listen for the sensor data; (3) the VU 30 needs to tell the CU 10 what the moisture sensor flags are; and (4) the CU 10 needs to tell the VU 30 to switch off the receiver 65.

The Command packet length from CU 10 to VU 30 may differ from either of the VU to CU packets so that a VU 30 will not mistakenly try to read another VUs 30 transmission as coming from the CU 10 (e.g., the VU ID numbers won't match anyway).

In this system, several devices may be using the same frequency as the CU to VU RF link, and since their proximity to one another is unknown it is assumed according to one embodiment that all receivers can hear all transmitters. According to the following example, there are two VUs 30 (e.g., each transmitting one minute update requests); two moisture sensors (e.g., each transmitting status approximately every 15 seconds); one CU (e.g., which only transmits when requested for information by the VUs). In this example, the moisture sensors 60 do not directly talk to any receivers 65 other than the matching ID one. However, the moisture sensors 60 generate RF signals that may be picked up by the other receiver, which will reject any signal that does not comply with its format and ID. Nonetheless, while any one transmitter at their frequency is transmitting, no other RF communication can take place, which is known as a collision is accommodated for in the following manner.

According to one embodiment, since the receiver chips are configured to detect when another transmitter is active, collision avoidance may be implemented by checking for an existing transmission and if one is detected, delaying before making another transmission attempt. For example, several transmission attempts will be made, possibly up to 10 attempts, after which a VU 30 will wait (e.g., until the next minute or set time) and try again.

One collision possibility may include two or more VUs 30 transmitting at the same time, which can occur if they both coincidentally start a transmission attempt, or if one makes an attempt when the CU 10 is responding to an earlier request, or if a neighbor happens to have a similar system installed and one of those VUs 30 are within range of the "home" VU 30 and just happens to transmit at the same time.

Another collision possibility may include one or more sensors 60 transmitting simultaneously. The sensors cannot detect collisions and so do not have the capability of waiting (e.g., however may be designed to retransmit the same data after a delay, for example 15 seconds)

The probability of collisions depends in part on the number of transmitters and the transmission duration. Since there are not many devices that can try to communicate simultaneously, and the data being communicated is very small, collisions in this system should be fairly infrequent and data throughput not particularly affected.

Figure 5:
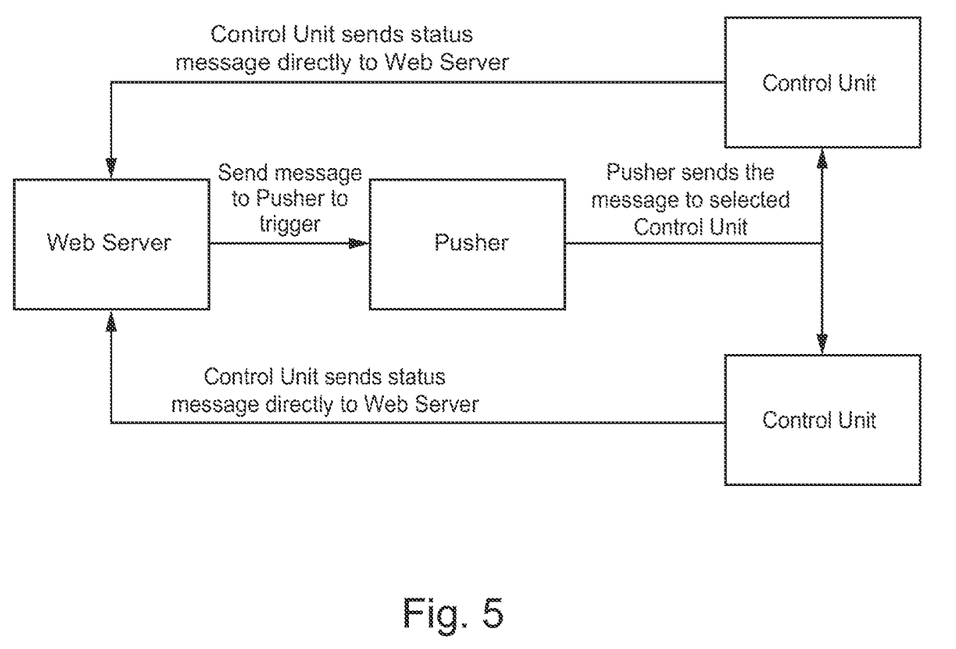
FIG. 5 is a diagram illustrating the architecture for communication between control unit(s) and Internet server of the system illustrated in FIG. 1.

FIG. 5 is a diagram illustrating the architecture for CU 10 to Web Server 20 and vice versa communication.

In this embodiment, the Pusher is a bidirectional communication channel that uses web sockets to talk to the client and direct HTTP POST using REST API for sending data from server to client. All the messages are routed through Pusher's server. The Pusher is configured to compartmentalize communication channels so that data is contained within a container called Application. To receive/send message, the receiver/sender needs to subscribe to an Application.

The Application is created from the Pusher's web front. Creating an Application creates some application specific credentials, e.g., an application id, key and a secret key. The credentials are used by both Receiver/Sender to send messages in a particular Application.

Each Application can further have Channels. Channels may be created on demand by the users and the Receiver may subscribe to the Channel and the Sender may publish messages on these channels. Only receivers who are subscribed to the channel may receive the message meant for that channel. Each channel may have multiple receivers. Multiple Senders can send a message to each channel Each Channel may have different Event Names to which a sender can send a message, e.g., CONTROL Event, DATA Event, MSG Event. These events may be user definable, and each event may have a message associated with it. Plus, there are some Pusher internal housekeeping events that the end units may need to service from time to time, e.g., pusher subscription messages, pusher keep alive messages, etc.

Each End Unit of the Pusher may need to login to an Application and Subscribe to a Channel to listen for messages.

Next is a description of one example of data flow from CU to Web and vice versa (e.g., assuming that server is running, Pusher account is created with an Application, and Webhooks are configured in the Pusher such that it reports to server whenever a Channel subscribes in the Pusher Application.)

First, the CU 10 connects to the Router 20. Next, the CU 10 connects to the Pusher and subscribes to a Channel name that is same as its ID. As the Channel is occupied by the CU 10 that just subscribed, the Pusher will send a Webhook to server saying the Channel is occupied. The server will then generate, for example, a hash key for the channel, store the hash key in its database and send the hash key to the CU 10 via Pusher.

Once the CU 10 gets the hash key, the CU 10 will (a) store the hash key for the current session, (b) create a status message, (c) append its CU ID code to message, (d) encode the entire message for transmission, and (e) create a GET message to post to the server and send the message.

Once the server will accept the message, the server (a) checks the hash key to determine which CU the message originated from, (b) decodes the encoded message and retrieves the CU ID code and message, and (c) matches the CU ID code with the owner of the hash key. If the hash key owner and CU ID code matches, the message is valid, queues the message for further processing. If the hash key does not match, ignores the message.

When the server sends a message to a particular CU 10, the server encodes the message from binary data and triggers the message for the Pusher using the defined Application and CU ID code as channel name. On CU 10, the Pusher will deliver the message and the CU 10 will read the message in a buffer, decode the buffer, read the binary data into structure, and update the Scheduler.

Next, is described one example of a method for connecting the CU 10 to a Wi-Fi network using a mobile device. After the initial setup, the system is designed to be programmed from a mobile device or computer.

The user plugs the CU 10 into an electrical power outlet via a power adaptor 126. It is preferable to position the CU 10 in an area that has a strong Wi-Fi signal as well as within 200 feet of the VU 30.

The user confirms that their mobile device (e.g., smartphone or tablet) is connected to a desired Wi-Fi network before downloading (e.g., from App Store or Google Play) and installing a wireless water timer and sprinkler system mobile application ("Wi-Fi CU App").

The user launches the downloaded Wi-Fi CU App and confirms that it is connected to the desired Wi-Fi network (e.g., home network) before connecting the system 1 to the network.

The user accesses a GUI website, creates a personal account, and registers the system, for example, by entering a serial number of the CU 10 (e.g., located on back cover of the CU 10 or packaging material provided with system). The user may also enter location specific information (e.g., area code, zip code, city/state, etc.) to enable local weather information to be provided. The user may also enter the serial number of each VU 30 connected to the CU 10 as part of this registration.

The user connects the VU(s) 30 to an outside faucet(s) and turns the faucet(s) "on."

The user connects a first end of a hose to a desired outlet of the VU 30 and a second end of the hose to a sprinkler device.

The user inserts a moisture sensor 60 in an area proximate to the sprinkler device and configures the moisture sensor 60 to communicate with the system 1.

Figure 9:
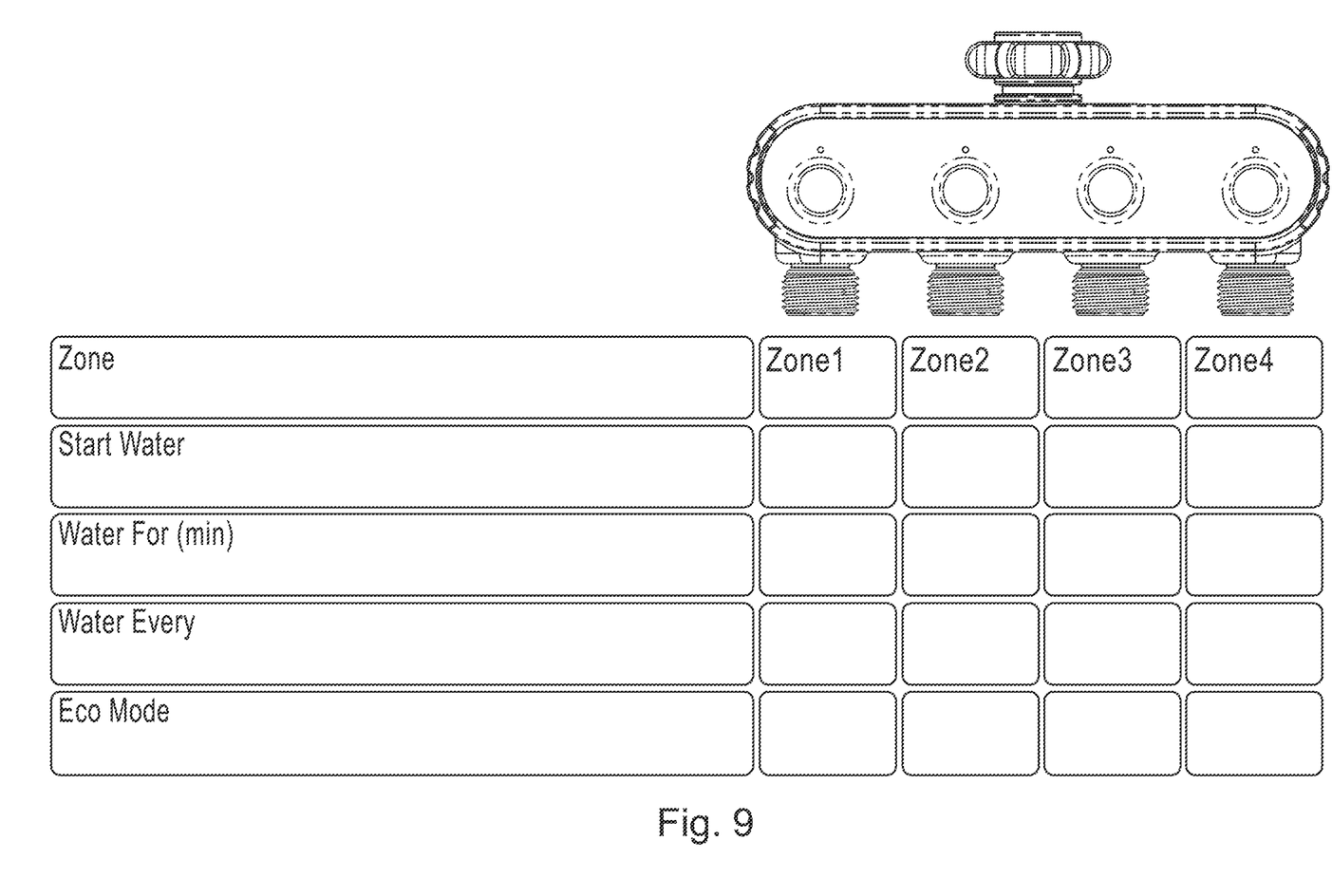
FIG. 9 is an example of a screenshot of a valve program grid according to one embodiment.

The user may also program the controller by accessing their personal account associated with the system on a GUI interface (webpage) via a computer or mobile device. One example of a webpage associated with the system is shown in FIG. 9, which is a screenshot of a valve program grid. The grid is configured to enable the user to enter valve specific program information, such as start time of the first watering cycle, watering time (minutes), time between watering cycle (e.g., water once every 4, 6, 8, or 12 hours, or once every 1, 2, 3, 4, 5, 6, or 7 days), and economy mode (e.g., saves water by repeatedly opening and closing the valves during the watering cycle, allowing more soak-in and less run-off. Each valve can have its own watering program.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

We claim:

1. A wireless water timer and valve control system, said system comprising:
    a control unit configured to be in wireless WiFi communication with a router via a WiFi network of the router;
    a valve unit configured to be in wireless communication with the control unit and designed to connect to a faucet, wherein the valve unit includes a valve that is operated wirelessly via a signal received by the control unit, and wherein the valve unit is dumb and configured to only open and close the valve when the control unit commands it or when a user pushes or touches a switch or a push button of the valve unit,
    said control unit is configured to communicate through said router over the Internet to a server external to the WiFi network of the router,
    said server is configured to receive user input from a user via a user's device containing instructions for operating of the valve, and said server is configured to transmit messages to said control unit based on said user input for operating of the valve, and said control unit is configured to transmit a valve operation command signal to the valve unit based on said messages received from said server,
    said server is configured to communicate with multiple control units that are each operated by different users and is configured to a) check messages received from the control units to identify a particular control unit corresponding to a particular user from which a message is received and to b) create messages for a particular control unit corresponding to a particular user including identification of the particular control unit, and
    said server being configured such that before receiving said user input from a user via a user's device containing instructions for operating of the valve, the user must register the control unit with the server with a control unit serial number or ID code via the user's device, and further including
    said user's device including a user's mobile device,
    said user's mobile device having or accessing wireless water timer and sprinkler system mobile software,
    said server being configured to receive user input from a user via said user's mobile device by the user downloading and installing the wireless water timer and sprinkler system mobile software on the user's mobile device or by accessing the wireless water timer and sprinkler system mobile software via the user's mobile device with which the user a) creates a personal account and during a setup process b) registers i) the control unit by entering a serial number or ID code of the control unit and ii) the valve unit by entering a serial number or ID code of the valve unit,
    said system being configured such that user enters a watering schedule for valves of the valve unit with the wireless water timer and sprinkler system mobile software via the user's mobile device that is received by the server, and the server sends the watering schedule to the user's control unit,
    said valve unit being configured to wirelessly communicate with a moisture sensor and to relay a moisture sensor status received from a moisture sensor to the control unit, and the control unit being configured to operate a valve unit based on a moisture sensor status relayed from the valve unit; and
    said valve unit being configured to shut off the valve if the valve unit loses contact with the control unit for a predetermined amount of time.

2. The wireless water timer and valve control system according to claim 1, wherein the control unit is configured to operate multiple valve units.

3. The wireless water timer and valve control system according to claim 1, wherein the wireless communication between the valve unit and the control unit is made by an ISM Band RF link.

4. The wireless water timer and valve control system according to claim 1, wherein the valve unit comprises multiple valves each wirelessly operated by the control unit.

5. The wireless water timer and valve control system according to claim 1, wherein the valve unit is configured to wirelessly communicate with a moisture sensor and relay a moisture sensor status received from the moisture sensor to the control unit, and the control unit is configured to operate the valve unit based on the moisture sensor status.

6. The wireless water timer and valve control system according to claim 1, wherein the control unit is configured to maintain the schedule and continue to operate the valve unit according to the schedule until the schedule is modified by a user.

7. The wireless water timer and valve control system according to claim 1, wherein the control unit is configured to upload a valve status to said server at a predefined time.

8. The wireless water timer and valve control system according to claim 7, wherein the predefined time is a time when the control unit contacts the server.

9. The wireless water timer and valve control system according to claim 1, wherein the valve unit is configured to shut off all valves if the valve unit loses contact with the control unit for a predetermined amount of time.

10. The wireless water timer and valve control system according to claim 1, further comprising a moisture sensor in wireless communication with said wireless water timer and valve control system, wherein the valve unit is configured to relay received sensor information from the moisture sensor to the control unit.

11. The wireless water timer and valve control system according to claim 1, wherein the valve unit comprises capacitive touch switches configured to manually open and close each of the valves on the valve unit.

12. The wireless water timer and valve control system according to claim 1, wherein the schedule sent to the control unit by the server is modifiable based on local weather information.

13. A method of using a wireless water timer and valve control system according to claim 1, said method comprising:
    connecting the control unit to the router via WiFi communication;
    connecting the valve unit to the control unit via wireless communication; and
    sending the valve operation command signal from the control unit to the valve unit,
    wherein the command signal opens and closes a valve on the valve unit.

14. The method of using a wireless water timer and valve control system of claim 13, further including the control unit communicating through the router over the Internet to the server external to the WiFi network of the router.

15. The method of using a wireless water timer and valve control system of claim 14, further including the server receiving user input from a user via a user's mobile device containing instructions for operating of the valve, and the server transmitting messages to the control unit based on the user input for operating of the valve, and the control unit transmitting the valve operation command signal to the valve unit based on the messages received from the server.

16. The method of using a wireless water timer and valve control system of claim 15, further including the server communicating with multiple control units and a) checking messages received from the control units to identify a particular control unit from which a message is received and b) creating messages for a particular control unit including identification of the particular control unit.

17. The method of using a wireless water timer and valve control system of claim 13, further including providing the control unit, valve unit, and router within a home of the user and providing the server remote to said home of the user.

18. The wireless water timer and valve control system according to claim 1, wherein each control unit is configured to operate multiple valve units, and wherein each of respective valve units is registered with a respective valve unit serial number or ID code via the user's mobile device or computer.

19. A wireless water timer and valve control system, said system comprising:
    a control unit configured to be in wireless communication with a router via a network of the router;
    a valve unit configured to be in wireless communication with the control unit and configured to connect to a faucet, said valve unit including a valve that is operated wirelessly via a signal received by the control unit, wherein valve unit is dumb and configured to only open and close the valve when the control unit commands it or when a user pushes or touches a switch or a push button of the valve unit,
    said control unit being configured to communicate through said router over the Internet to a server external to the network of the router,
    said control unit being configured to operate the valve unit based at least on a schedule sent to the control unit by said server;
    said server being configured to communicate with multiple control units that are each operated by different users and to receive schedule information from each respective user via the respective user's device, wherein each respective user's device includes a mobile device or computer having a graphical user interface via which the respective user enters said schedule information, and to send said schedule to the control unit based on said schedule information, and said server being configured such that before the respective user is able to input the schedule information via the graphical user interface of the mobile device or computer, the respective user must register the control unit with a control unit serial number or ID code via the graphical user interface of the mobile device or computer, and said server being configured such that a respective user also registers the valve unit by entering a valve unit serial number or ID code via the graphical user interface of the mobile device or computer;
    said valve unit being configured to wirelessly communicate with a moisture sensor and to relay a moisture sensor status received from a moisture sensor to the control unit, and the control unit being configured to operate a valve unit based on a moisture sensor status relayed from the valve unit; and
    said valve unit being configured to shut off the valve if the valve unit loses contact with the control unit for a predetermined amount of time.

20. The wireless water timer and valve control system according to claim 19, wherein the control unit is configured to continue watering according to the last schedule downloaded if Internet connection is lost.

21. The wireless water timer and valve control system according to claim 19, wherein said registration includes logging into a website, via the mobile device or computer, that supports the graphical user interface using a serial number associated with the control unit.

22. The wireless water timer and valve control system according to claim 19, wherein after the control unit is registered with a control unit serial number or ID code via the mobile device or computer, the control unit automatically connects to the server and obtains schedule data using the control unit serial number or ID code.

23. The wireless water timer and valve control system according to claim 19, wherein the server is further configured such that in addition to registering the control unit with a control unit serial number or ID code via the mobile device or computer, a user enters location specific information to enable local weather information to be provided.

24. The wireless water timer and valve control system according to claim 19, wherein the control unit is configured to send command packets to said valve unit containing an ID of the valve unit.

25. The wireless water timer and valve control system according to claim 19, further comprising a moisture sensor in wireless communication with the valve unit, the valve unit relaying received sensor information received from said moisture sensor to the control unit.

26. A wireless water timer and valve control system, said system comprising:
    a control unit configured to be in wireless communication with a router via a network of the router;
    a valve unit configured to be in wireless communication with the control unit and designed to connect to a faucet, wherein the valve unit includes a valve that is operated wirelessly via a signal received by the control unit, and wherein the valve unit is dumb and configured to only open and close the valve when the control unit commands it or when a user pushes or touches a switch or a push button of the valve unit,
    said control unit is configured to communicate through said router over the Internet to a server external to the network of the router,
    said server is configured to receive user input from a user via a user's device containing instructions for operating of the valve, and said server is configured to transmit messages to said control unit based on said user input for operating of the valve, and said control unit is configured to transmit a valve operation command signal to the valve unit based on said messages received from said server,
    said server is configured to communicate with multiple control units that are each operated by different users and is configured to a) check messages received from the control units to identify a particular control unit corresponding to a particular user from which a message is received and to b) create messages for a particular control unit corresponding to a particular user including identification of the particular control unit, and said server being configured such that before receiving said user input from a user via a user's device containing instructions for operating of the valve, the user must register the control unit with the server with a control unit serial number or ID code via the user's device, and further including said user's device including a user's mobile device, said user's mobile device having a wireless water timer and sprinkler system mobile software application, said server being configured to receive user input from a user via said user's mobile device by the user downloading and installing the wireless water timer and sprinkler system mobile software application on the user's mobile device via which the user a) creates a personal account and during setup processes b) registers i) the control unit by entering a serial number or ID code of the control unit and ii) the valve unit by entering a serial number or ID code of the valve unit, said system being configured such that user enters a watering schedule for valves of the valve unit via the wireless water timer and sprinkler system mobile software application of the user's mobile device that is received by the server, and the server sends the watering schedule to the user's control unit, and said valve unit being configured to shut off the valve if the valve unit loses contact with the control unit.

\* \* \* \* \*